(12) United States Patent
Lee et al.

(10) Patent No.: US 12,146,865 B2
(45) Date of Patent: Nov. 19, 2024

(54) SLIDING APPARATUS FOR DURABILITY EVALUATION OF FLEXIBLE MATERIAL AND EVALUATION SYSTEM

(71) Applicant: FlexiGO INC., Cheonan-si (KR)

(72) Inventors: Ki Yong Lee, Cheonan-si (KR); Hyeon Bong Moon, Cheonan-si (KR); Ho Moon You, Cheongju-si (KR)

(73) Assignee: FlexiGO INC., Cheonan-si (KR)

( * ) Notice: Subject to any disclaimer, the term of this patent is extended or adjusted under 35 U.S.C. 154(b) by 269 days.

(21) Appl. No.: 17/894,008

(22) Filed: Aug. 23, 2022

(65) Prior Publication Data

US 2022/0404252 A1 Dec. 22, 2022

Related U.S. Application Data

(63) Continuation of application No. PCT/KR2020/013945, filed on Oct. 13, 2020.

(30) Foreign Application Priority Data

Mar. 17, 2020 (KR) .................. 10-2020-0032669

(51) Int. Cl.
*G01N 3/34* (2006.01)
*G01N 3/20* (2006.01)

(52) U.S. Cl.
CPC .............. *G01N 3/34* (2013.01); *G01N 3/20* (2013.01); *G01N 2203/0005* (2013.01); *G01N 2203/0023* (2013.01); *G01N 2203/0037* (2013.01)

(58) Field of Classification Search
CPC .... G01N 3/34; G01N 3/20; G01N 2203/0005; G01N 2203/0023; G01N 2203/0037

USPC ........................................................... 73/225
See application file for complete search history.

(56) References Cited

U.S. PATENT DOCUMENTS

2019/0154555 A1* 5/2019 Han .................. G01N 3/04

FOREIGN PATENT DOCUMENTS

| JP | 2018-188335 A | 11/2018 |
| KR | 10-1349789 B1 | 1/2014 |
| KR | 10-1489667 B1 | 2/2016 |
| KR | 10-2017-0096087 A | 8/2017 |
| KR | 10-1774302 B1 | 9/2017 |
| KR | 101843874 B1 * | 3/2018 |

(Continued)

OTHER PUBLICATIONS

Translation of WO-2019165608-A1 (Year: 2019).*
Translation of KR-101843874-B1 (Year: 2018).*

*Primary Examiner* — Nathaniel T Woodward
(74) *Attorney, Agent, or Firm* — United One Law Group LLC; Kongsik Kim; Jhongwoo Peck

(57) ABSTRACT

A sliding apparatus for durability evaluation of a flexible material includes a base unit having a folding space formed therethrough, a sliding unit which is coupled to the base unit to be slidably movable and to which one side of a flexible material to be evaluated is fixed, and a folding unit which is arranged to be apart from the sliding unit, to which the other side of the flexible material is fixed, and which rotates with respect to the sliding unit to in-fold or out-fold the flexible material in an unfolded state. The sliding unit changes the position of the bent portion formed in the flexible material as the sliding unit slidably moves on the base unit with the flexible material in an in-folded state or out-folded state.

13 Claims, 12 Drawing Sheets

(56) References Cited

FOREIGN PATENT DOCUMENTS

KR  10-1866738 B1  6/2018
WO  WO-2019165608 A1 * 9/2019

* cited by examiner

SLIDING APPARATUS FOR DURABILITY EVALUATION OF FLEXIBLE MATERIAL AND EVALUATION SYSTEM

CROSS-REFERENCE TO RELATED APPLICATIONS

The present application is a Continuation of International Application No. PCT/KR2020/013945 filed on Oct. 13, 2020, which claims priority from Korean Application No. 10-2020-0032669 filed on Mar. 17, 2020. The aforementioned applications are incorporated herein by reference in their entireties.

TECHNICAL FIELD

The present disclosure relates to a sliding apparatus for durability evaluation of a flexible material and an evaluation system. More particularly, the present disclosure relates to a sliding apparatus for durability evaluation of a flexible material and an evaluation system, the sliding apparatus being configured, when a folding test of the flexible material is performed, to implement an in-folding operation and an out-folding operation of the flexible material on the basis of an unfolded state by one folding unit, and to implement a sliding operation so as to change a position of a bent portion formed in the flexible material in a folded state.

RELATED ART

In general, conventional display panels used for displays such as television monitors or computer monitors, or various portable electronic devices have a flat structure due to use of inflexible glass substrates. Therefore, the conventional display panels are monotonous and have limitations in their applications.

For this reason, and also due to the development of science and technology, flexible materials such as plastic, etc. are used for the display panels, and so-called flexible display devices are developed and produced. For example, flexible display panel techniques in which a flexible material may be folded or rolled like a scroll have also been developed.

For example, US Patent Application Publication No. US2014/0247544 (Roll-type flexible device for displaying) disclosed the technique in which a flexible display part is wrapped around a roll inside a housing by using a rod assembly connecting a plurality of rotatable-X shaped rods to each other.

Thin film transistor liquid crystal display (TFT LCD), organic electroluminescence (EL), electrophoresis, etc. are used as display elements used in the variously shaped flexible display devices. Since the durability of a material (hereinbelow, flexible material) applied to such display element is directly related to the life of a product, a durability test of a selected material is essentially performed before designing the product.

Various types of tests are performed as the above-mentioned durability test, and among them, a folding test is included. The folding test is a test that repeats bending and unfolding the flexible material, and for example, a device mechanically rotating a rotation plate with a part of specimen of the flexible material held by a fixation plate and a remaining part of the specimen held by the rotation plate is also used for the folding test.

However, a precise folding test could not be performed with the above-described type of folding device. The reason is that, when rotation of the rotation plate is performed, it is impossible to block a tensile force from acting on the flexible material. The inability to implement only a pure bending operation of the flexible material greatly reduces the reliability of the folding test.

As related arts, Korean Patent No. 10-1349789 (Title: Testing device for bending FPCB), and Korean Patent Application Publication No. 10-2016-0087143 (Title: Apparatus for durability test of solar cell module folding) were disclosed.

SUMMARY

The present disclosure has been made keeping in mind the above problems occurring in the related art, and an objective of the present disclosure is to provide a sliding apparatus for durability evaluation of a flexible material and an evaluation system, the sliding apparatus being configured, when a folding test of the flexible material is performed, to implement an in-folding operation and an out-folding operation of the flexible material on the basis of an unfolded state by one folding unit, and to implement a sliding operation so as to change a position of a bent portion formed in the flexible material in a folded state.

In order to achieve the above objective, according to one aspect of the present disclosure, a sliding apparatus for durability evaluation of a flexible material, the sliding apparatus including: a base unit having a folding space formed therethrough; a sliding unit configured to hold a first portion of the flexible material to be evaluated, and coupled to the base unit to be slidably movable; and a folding unit configured to hold a second portion of the flexible material, and arranged to be spaced apart from the sliding unit, and configured to be rotated based on the sliding unit to in-fold or out-fold the flexible material in an unfolded state, wherein the sliding unit may be configured to change a position of a bent portion formed in the flexible material as the sliding unit may slidably move on the base unit with the flexible material in an in-folded state or out-folded state.

The sliding unit may include: a sliding rail formed long at the base unit in a longitudinal direction of the base unit; a slider slidably coupled to the sliding rail; and a grip member coupled to the slider, and configured to hold the first portion of the flexible material.

The sliding unit may include: a sliding motor configured to generate a rotating force; and a sliding changing part configured to move the slider by the rotating force of the sliding motor.

The sliding unit may further include: a connecting bracket provided at the slider to face the sliding changing part, and removably coupled to the sliding changing part.

The folding unit may include: a moving unit arranged to be spaced apart from the sliding unit so as to form the same level as the sliding unit in the unfolded state, and configured to hold the second portion of the flexible material; a motion guide unit configured to form a rotating path of the moving unit to allow the moving unit to be rotatable on a position between the sliding unit and the moving unit; and a motion unit connecting the motion guide unit to the moving unit, wherein the moving unit may be configured to in-fold or out-fold the flexible material in the unfolded state as being rotated along the motion guide unit with respect to the sliding unit.

The motion guide unit may include a circular guide groove formed by being recessed to correspond to the rotating path of the moving unit, the motion unit may include: a rotational shaft rotatably provided at the position to be rotatable with respect to the motion guide unit; a motion block fixed to the rotational shaft; a sliding block coupled to the motion block to be slidable in the longitudinal direction; and a guide block rotatably coupled to the sliding block, and having a guide protrusion protruding thereon, the guide protrusion being coupled to the guide groove in a fitted manner so that the guide block may move along the guide groove to correspond to rotation of the moving unit, and the moving unit may be fixed to the guide block.

The guide groove may include: an in-folding stopper configured to mark an in-folding completion position; and an out-folding stopper configured to mark an out-folding completion position.

The guide groove may include: a first arc in-folding groove to generate a moving path of the guide protrusion in response to an in-folding operation on the moving path of the moving unit; a second arc in-folding groove provided outside the first in-folding groove in parallel, and configured to generate a moving path of the guide protrusion in response to the in-folding operation on the moving path of the moving unit; a first arc out-folding groove communicating with the first in-folding groove, and configured to generate a moving path of the guide protrusion in response to an out-folding operation on the moving path of the moving unit; and a second arc out-folding groove provided outside the first out-folding groove in parallel while communicating with the second in-folding groove, and configured to generate a moving path of the guide protrusion in response to the out-folding operation on the moving path of the moving unit.

The guide protrusion may include: a first protrusion configured to move inside the first in-folding groove and the first out-folding groove; and a second protrusion configured to move inside the second in-folding groove and the second out-folding groove, wherein any one of the first protrusion and the second protrusion may be included in any one of imaginary straight lines passing through the position, and the other of the first protrusion and the second protrusion may be included in another line of the imaginary straight lines passing through the position.

The folding unit may further include: at least any one of a motion driving unit configured to rotate the motion unit with respect to the motion guide unit; and a rotation limitation unit configured to select whether the moving unit is rotated or not with respect to the motion guide unit at the position.

The sliding unit may further include: a motion limiting sensor part configured to detect a state of the grip member approaching the folding unit and a state of the grip member far away from the folding unit so as to limit a sliding motion of the slider.

The sliding apparatus may further include: a sliding support unit, when the sliding unit slidably moves from the base unit while the flexible material is in-folded or out-folded, the sliding support unit being configured to support the flexible material.

When a radius of the in-folded bent portion formed in the flexible material in the in-folded state is R0 and a radius of the out-folded bent portion formed in the flexible material in the out-folded state is R1, R1 may indicate a radius larger than R0, and a spacing distance between the sliding unit and the moving unit on the basis of the in-folding operation may indicate $\pi R1$.

According to the present disclosure, an evaluation system for durability of a flexible material may include: a sliding apparatus described in any one of claims 1 to 9; a work plate unit coupled to a base unit; and a support plate unit provided in the work plate unit, and configured to support a sliding motor provided in a sliding unit and a motion driving unit provided in a folding unit.

The work plate unit may have a communication space formed by penetrating therethrough to correspond to the folding space.

According to the sliding apparatus for durability evaluation of the flexible material and the evaluation system according to the present disclosure, when the folding test of the flexible material is performed, the in-folding operation and the out-folding operation of the flexible material can be implemented in the unfolded state by the one folding unit, and a sliding operation can be implemented, so that a position of the bent portion formed in the flexible material in the folded state is changed.

In other words, when a folding test of the film type flexible material is performed, as the one folding unit repeatedly folds both opposite surfaces of the flexible material 180 degrees each on the basis of the flexible material, the flexible material can be repeatedly folded opposite directions, and as the sliding unit slidingly moves in the folded state, a position of the bent portion formed in the flexible material can be changed.

Furthermore, with coupling between the sliding unit and the folding unit in the base unit, initial settings of the flexible material can be clarified, a sliding operation of the sliding unit and a folding operation of the folding unit can be clarified, and sliding of the sliding unit in the folding state can be clarified.

Furthermore, with the detailed structure of the sliding unit, sliding of the slider on the base unit B can be smooth, whereby it is possible to prevent the folding unit from interfering with the sliding unit in response to the out-folding operation of the folding unit.

Furthermore, with the additional structure of the sliding motor and the sliding changing part in the sliding unit, a linear movement of the slider can be stabilized by the rotating force of the sliding motor and a linear reciprocating the flexible material can be clarified.

Furthermore, as the sliding unit includes the connecting bracket, the connecting bracket and the sliding changing part are removably coupled to each other and the connecting bracket and the slider are separable from the sliding changing part, so that the replacement and the maintenance of the sliding apparatus can be simplified according to the specifications of the flexible material.

Furthermore, with the detailed structure of the sliding changing part in the sliding unit, a rotating movement of the sliding motor is converted into a linear reciprocating movement of the slider so that the sliding movement of the slider can be efficiently performed.

Furthermore, with the detailed structure of the folding unit, the folding operation of the flexible material is clarified, and a radius of the in-folded bent portion according to in-folding and a radius of the out-folded bent portion according to out-folding can be implemented differently from each other.

Furthermore, the coupling between the motion guide unit and the motion unit in the folding unit, it is possible to prevent the moving unit from flowing unnecessarily in the rotating process of the moving unit.

Furthermore, with the detailed structure of the motion unit, rotation of the moving unit is smoothly performed, and when a folding test of the flexible material is performed, and when an in-folding operation and an out-folding operation are implemented, the flexible material is prevented from receiving a miscellaneous force including a tensile force, so that the reliability of the test is high and durability evaluation can be accurately performed.

Furthermore, with the structure of the stopper, when a folding test of the flexible material is performed, and when the in-folding operation and the out-folding operation are implemented, the guide protrusion is stopped in the guide groove, and the folding completion state of the flexible material F can be clarified.

Furthermore, with the detailed structure of the guide groove, the rotating path of the moving unit is clarified, and a parallel state between the grip member of the sliding unit and the moving unit at the folding completion position can be stabilized.

Furthermore, with the detailed structure of the guide protrusion, when the moving unit is rotated, an operation of the motion unit can be stabilized.

Furthermore, with the structure of the motion driving unit, a folding test can be automated.

Furthermore, with the structure of the rotation limitation unit, the present disclosure can select whether the moving unit is rotated or not.

Furthermore, with the additional structure of the motion limiting sensor part in the sliding unit, sliding of the slider is limited, an initial position of the slider in the unfolding state can be clarified in response to the in-folding operation and the out-folding operation.

Furthermore, with the additional structure of the sliding support unit, as the slider slidably moves in a state with the folded flexible material, the radius of the bent portion formed in the flexible material is maintained, and position tracking of the bent portion can be checked.

Furthermore, with numerical limitation, it is possible to prevent the in-folding operation and out-folding operation from interfering with each other in the one folding unit, and the flexible material can be safely protected.

Furthermore, according to the present disclosure, by the additional structure of the work plate unit, the base unit of the sliding apparatus can be recovered to an original location, and it is possible to prevent the base unit from moving to correspond to an operation of the sliding apparatus.

Furthermore, with the additional structure of the support plate unit, the sliding motor of the sliding apparatus, the motion driving unit of the folding unit, the sliding changing part, and the motion limiting sensor part are locked to regular positions thereof, and power transmission system can be clarified.

Furthermore, with the communication space, corresponding to the out-folding operation, it is possible to prevent the moving unit from interfering with the work plate unit.

DETAILED DESCRIPTION

Figure 1:
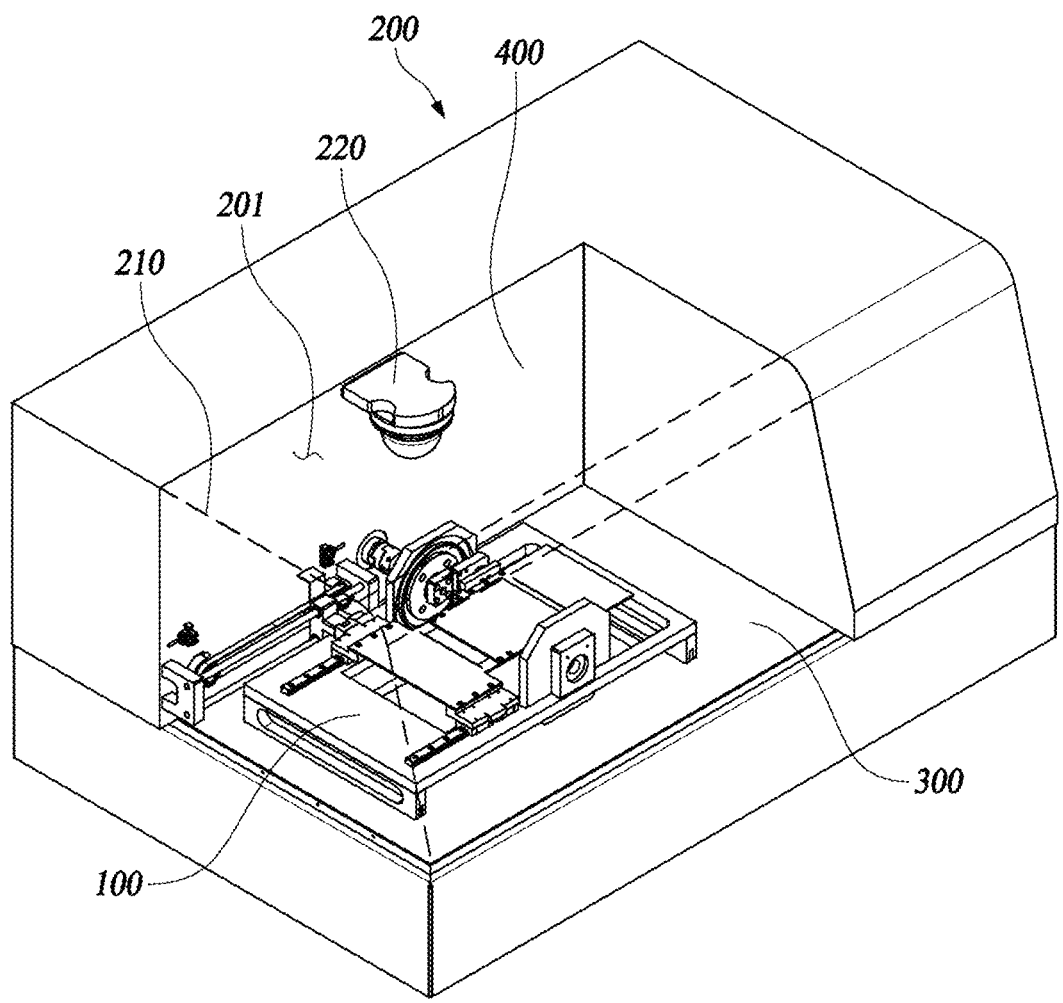
FIG. 1 is a perspective view showing an evaluation system for durability evaluation of a flexible material according to an embodiment of the present disclosure.
Figure 2:
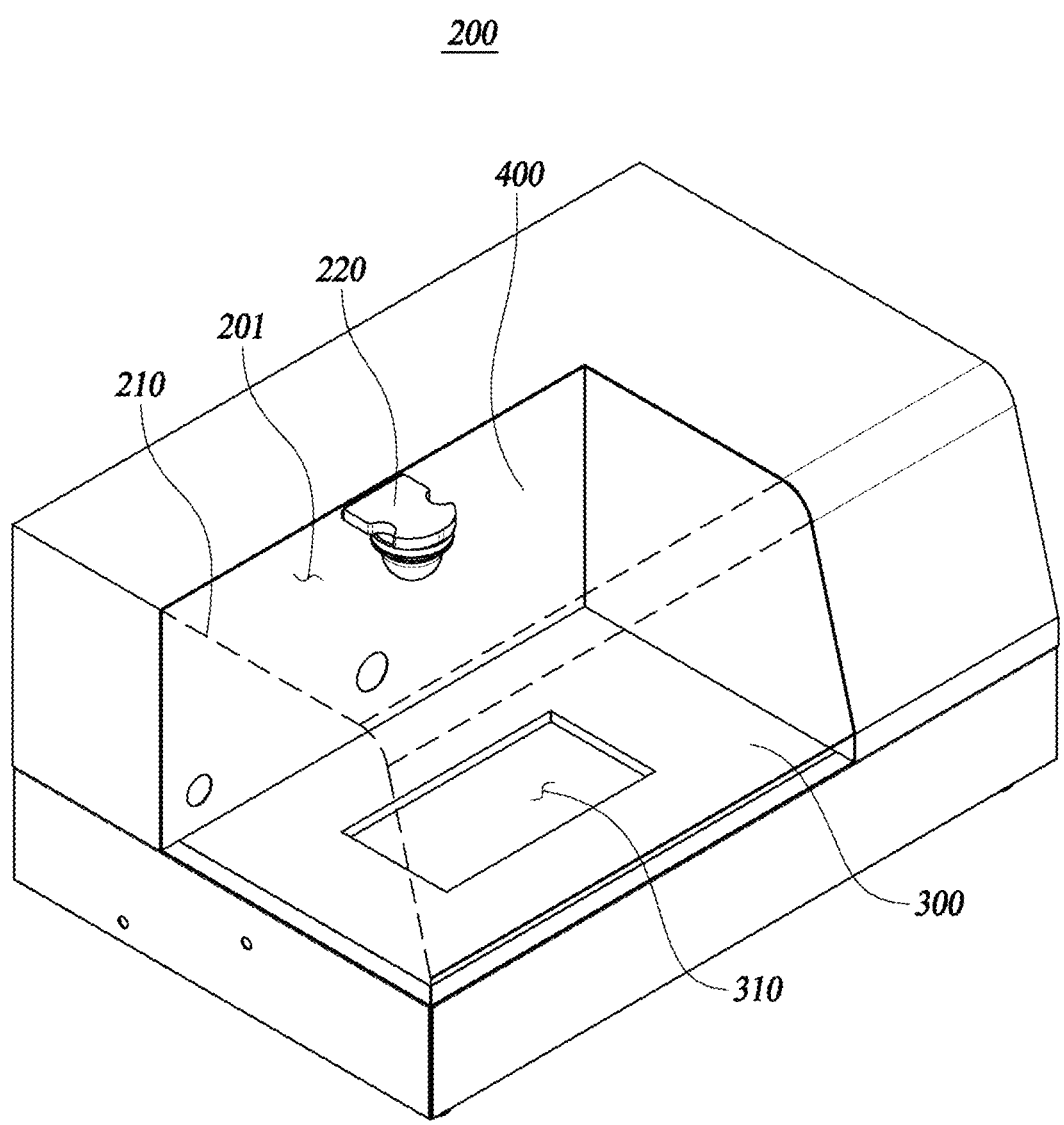
FIG. 2 is a perspective view showing a structure of a system main body of the evaluation system for durability evaluation of a flexible material according to the embodiment of the present disclosure.
Figure 3:
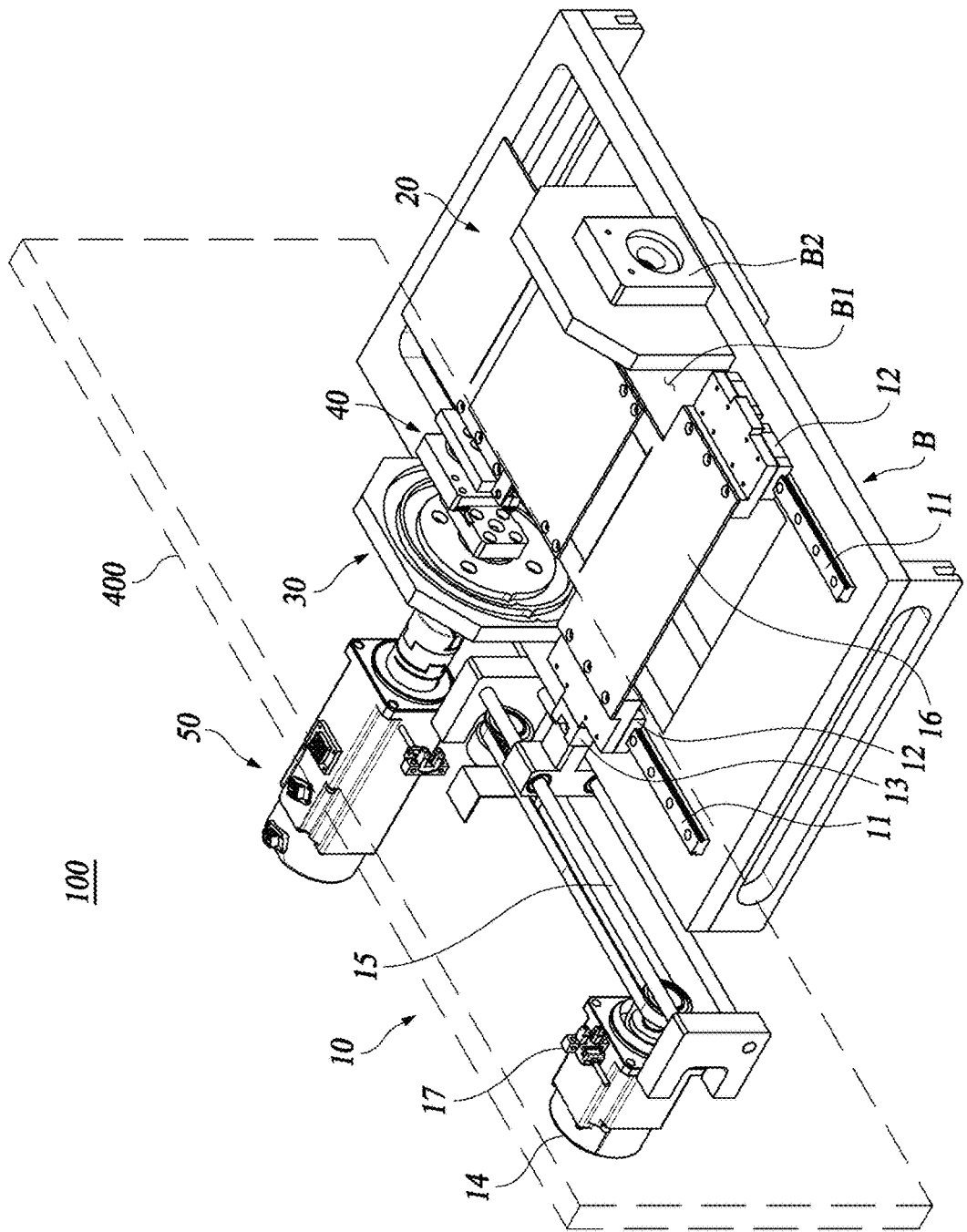
FIG. 3 is a perspective view showing a sliding apparatus of the evaluation system for durability evaluation of a flexible material according to the embodiment of the present disclosure.
Figure 4:
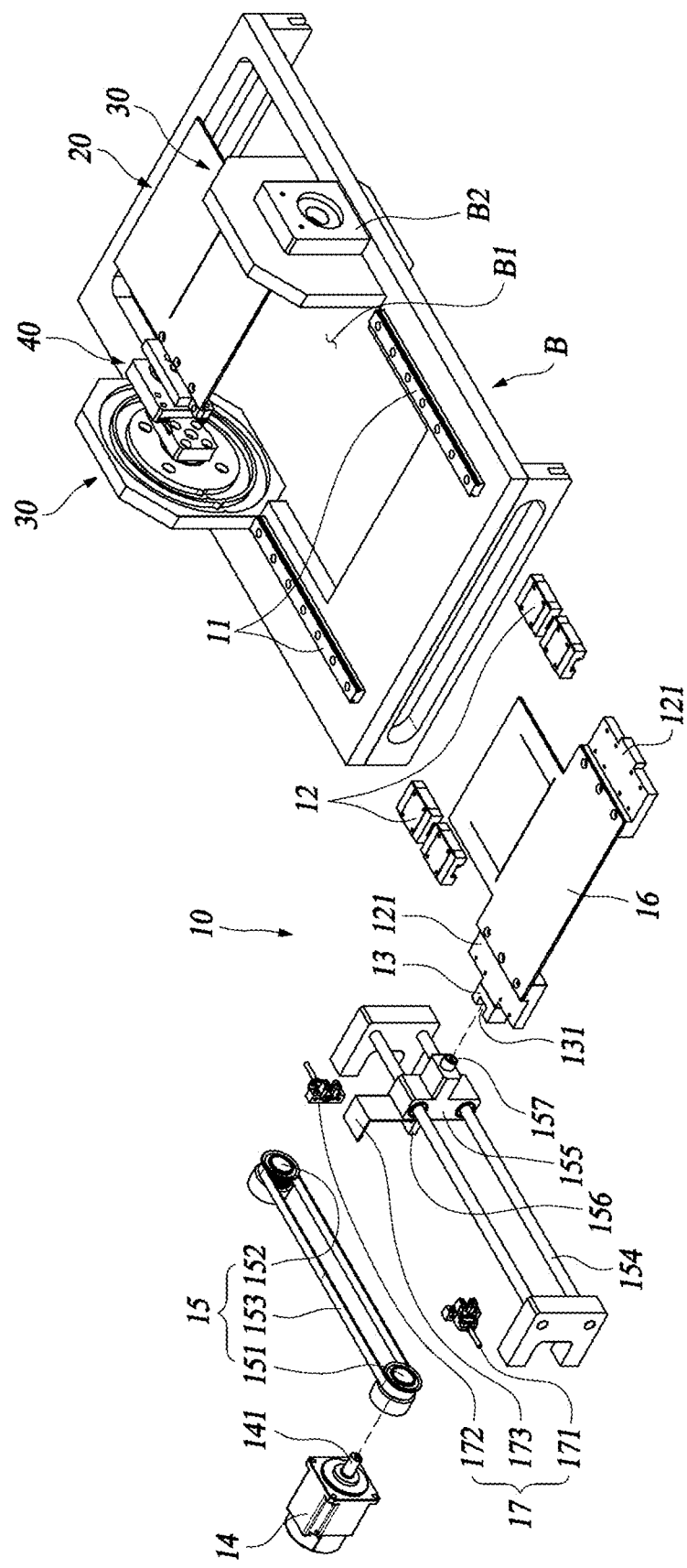
FIG. 4 is a partial exploded-perspective view showing an exploded state of a sliding unit of the sliding apparatus for durability evaluation of a flexible material according to the embodiment of the present disclosure.
Figure 5:
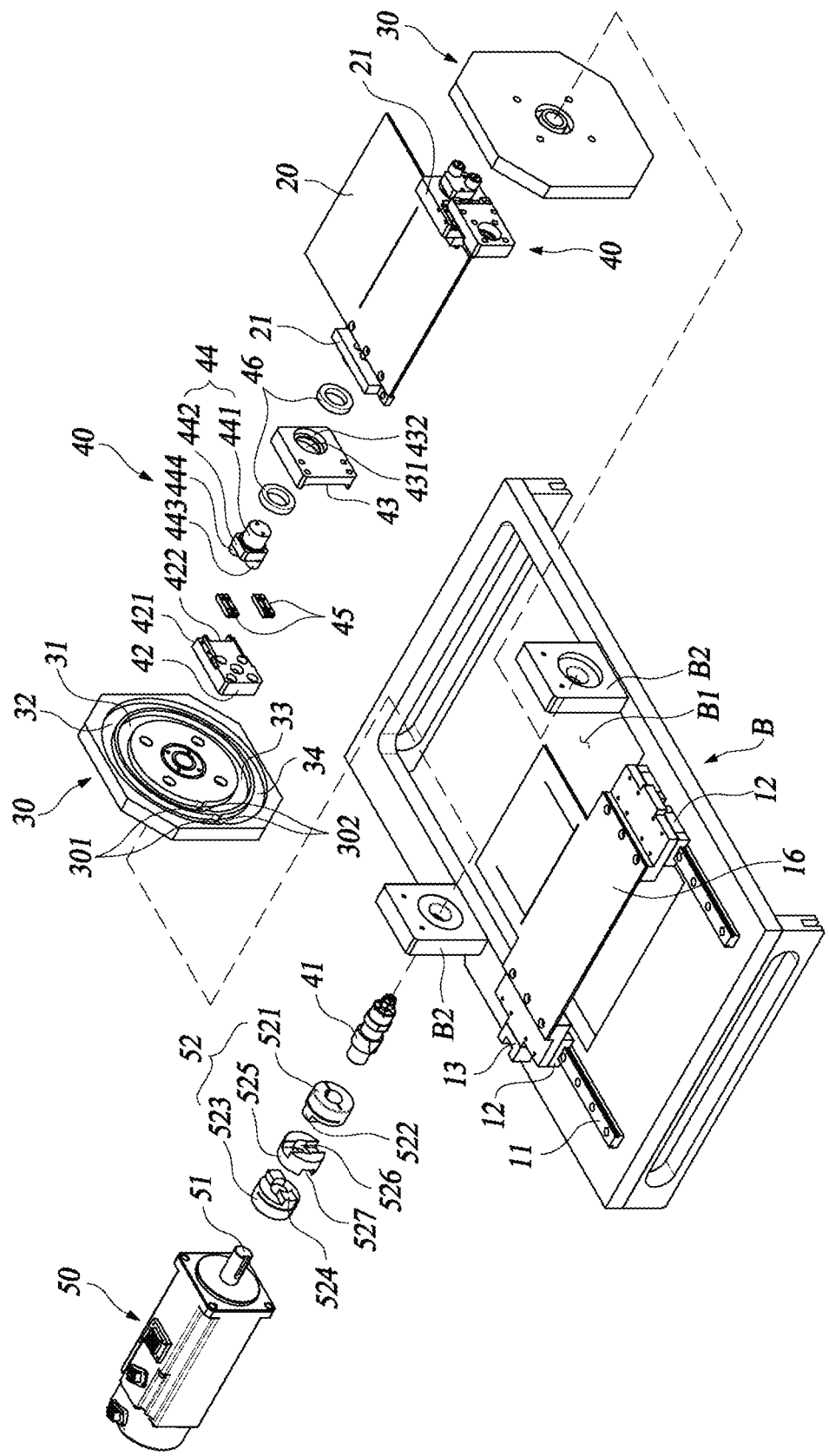
FIG. 5 is a partial exploded-perspective view showing an exploded state of a folding unit of the sliding apparatus for durability evaluation of a flexible material according to the embodiment of the present disclosure.
Figure 6:
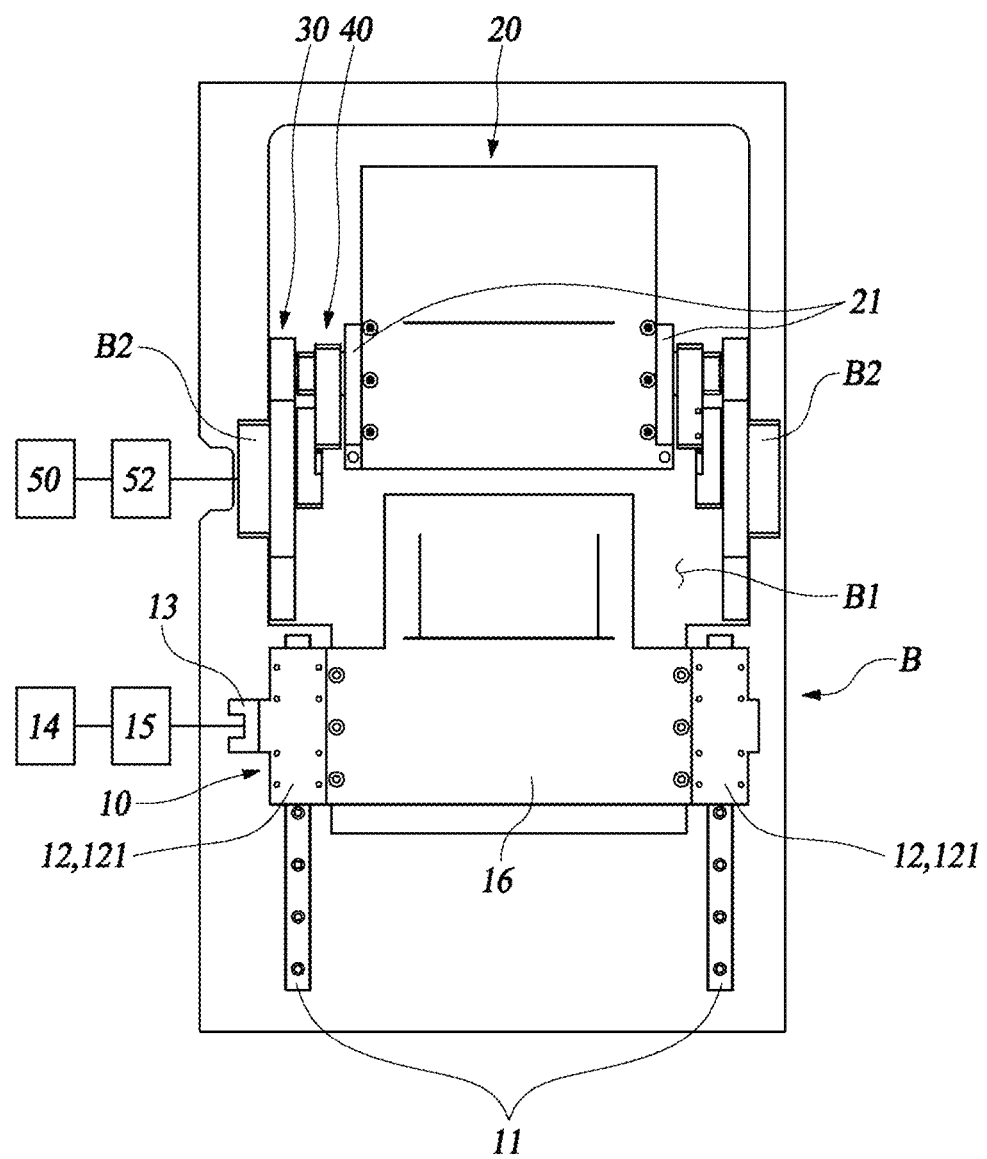
FIG. 6 is a plane view showing the sliding apparatus for durability evaluation of a flexible material according to the embodiment of the present disclosure.

Hereinbelow, a rolling apparatus and an evaluation system for evaluating durability of a flexible material according to an embodiment of the present disclosure will be described with reference to accompanying drawings. Herein, the present disclosure is not limited to the embodiment described herein. Furthermore, in the following description of the present disclosure, detailed descriptions of known functions and components incorporated herein will be omitted so as to clarify the subject matter of the present disclosure.

The evaluation system for durability evaluation of a flexible material according to the embodiment of the present disclosure may include a sliding apparatus 100 and a system main body 200.

The sliding apparatus 100 may implement a folding operation of the flexible material F in an unfolded state and a sliding operation with respect to one side of the flexible material F in a folded state. The sliding apparatus 100 may include a sliding apparatus for durability evaluation of a flexible material 100 according to the embodiment of the present disclosure.

In the embodiment of the present disclosure, the flexible material F includes various sheets, various films, flexible displays, etc., and as a folding operation is completed, a bent portion is formed. When the flexible material F is folded in the embodiment of the present disclosure, the flexible material F loses the function thereof.

According to the embodiment of the present disclosure, the sliding apparatus 100 for durability evaluation of the flexible material F includes a base unit B, a sliding unit 10, and a folding unit, and may include a sliding support unit 70.

The base unit B may form the bottom of the sliding apparatus 100. Preferably, the base unit B has a folding space B1 formed by penetrating through the base unit to correspond to a folding operation of the folding unit. Furthermore, corresponding to a width of the folding space B1, it is advantageous for folding brackets B2 to be respectively provided at widthwise opposite ends of the base unit B. Furthermore, corresponding to the width of the folding space B1, it is advantageous for sliding rails 11 to be respectively provided at the widthwise opposite ends of the base unit B with intervals from the folding brackets B2. The widthwise direction of the base unit B is substantially perpendicular to a longitudinal direction of the base unit B or a sliding direction of the sliding unit 10, and substantially in parallel to a shaft direction of a rotational shaft 41.

The base unit B is coupled to a work plate unit 300 of the system main body 200. The base unit B is capable of being attached to and detached from the work plate unit 300 by an apparatus holding unit (not shown) as a medium, and maintenance for some or all of the sliding apparatus 100 is simply performed.

The sliding unit 10 fixes a first portion of the flexible material F to be evaluated. The sliding unit 10 is coupled to the base unit B to be slidably movable. The sliding unit 10 slidably moves on the base unit B with the flexible material F in-folded or out-folded, thereby changing a location of a bent portion F1, F2 formed in the flexible material F.

The sliding unit 10 may include the sliding rails 11, a slider 12, and a grip member 16.

The sliding rails 11 is formed long in the longitudinal direction of the base unit B. The sliding rails 11 include a pair of sliding rails 11 and the pair of sliding rails 11 are respectively provided at the widthwise opposite ends of the base unit B, so that the sufficient folding space B1 may be secured.

The slider 12 is coupled to both the sliding rails 11 to be slidably movable. The slider 12 includes a plurality of sliders 12 corresponding to the pair of sliding rails 11. Furthermore, at least one slider 12 may be provided to correspond to one sliding rail 11. The sliding bracket 121 is coupled to the slider 12 in a stackable manner. Opposite ends of the grip member 16 are respectively coupled to the pair of sliding brackets 121 in the widthwise direction of the base unit B.

Herein, a coupling structure between the sliding rails 11 and the sliders 12 is not limited, and with various known forms are used to allow the sliders 12 to slidably move on the sliding rails 11, and to prevent movement of the sliders 12.

The grip member 16 is coupled to both the sliders 12. The opposite ends of the grip member 16 are respectively coupled to the sliding brackets 121 of the pair of sliders 12. The grip member 16 holds the first portion of the flexible material F in the stackable manner.

The sliding unit 10 includes a sliding motor 14 and a sliding changing part 15.

The sliding motor 14 generates a rotating force for sliding of the slider 12. It is advantageous for the sliding motor 14 to be coupled to a support plate unit 400. The sliding motor 14 is coupled to the sliding changing part 15. The sliding motor 14 includes a sliding shaft 141 connected to the sliding changing part 15.

The sliders 12 slidably move by the sliding changing part 15 with the rotating force of the sliding motor 14. The sliding changing part 15 may include a drive roller 151, an idle roller 152, a transmission belt 153, a sliding guide 154, and a change-movable member 155.

The drive roller 151 is coupled to the sliding shaft 141 of the sliding motor 14 and is rotated by the sliding motor 14. The drive roller 151 is rotatably coupled to the support plate unit 400.

The idle roller 152 is arranged to be spaced apart from the drive roller 151 in the longitudinal direction of the base unit B and is rotatable. The idle roller 152 is rotatably coupled to the support plate unit 400. The idle roller 152 is coupled to the support plate unit 400 to be slidably movable in the longitudinal direction of the base unit B, thereby adjusting a tension of the transmission belt 153.

The transmission belt 153 connects the drive roller 151 to the idle roller 152 in a caterpillar track manner.

The drive roller 151 and the idle roller 152 consist of timing pulleys, and the transmission belt 153 consists of a timing belt, so that the rotating force of the sliding motor 14 may be stably transmitted, and the transmission belt 153 may stably moving in the caterpillar track manner without slip.

The sliding guide 154 is formed long in the longitudinal direction of the base unit B while being spaced apart from the transmission belt 153. The sliding guide 154 forms a path of the change-movable member 155. The sliding guide 154 may be coupled to the support plate unit 400 or the work plate unit 300.

The change-movable member 155 is slidably coupled to the sliding guide 154 while being held to the transmission belt 153. The change-movable member 155 is coupled to the slider 12 or the sliding bracket 121 and slidably moves along the sliding guide 154, and the slider 12 slidably moves along the sliding rail 11. The change-movable member 155 includes a belt bracket 156 for coupling the change-movable member 155 to the transmission belt 153, and a removable protrusion 157 for removably coupling the change-movable member 155 to the slider 12.

The sliding unit 10 may include a connecting bracket 13.

The connecting bracket 13 is provided on the slider 12 or the sliding bracket 121 toward the sliding changing part 15. The connecting bracket 13 is removably coupled to the removable protrusion 157 of the sliding changing part 15. As a removable groove 131 coupled to the removable protrusion 157 in a fitted manner is formed by recessing the connecting bracket 13, the connecting bracket 13 and the change-movable member 155 of the sliding changing part 15 may be removably coupled to each other in response to the fitted-coupling between the removable groove 131 and the removable protrusion 157.

The sliding unit 10 may include a motion limiting sensor part 17.

The motion limiting sensor part 17 may detect a state of the grip member 16 approaching the folding unit and a state of the grip member 16 far away from the folding unit. The motion limiting sensor part 17 may limit sliding amount of the slider 12. The motion limiting sensor part 17 may include a first limiting part 171, a second limiting part 172, and the communicating protrusion 173.

The communicating protrusion 173 is provided at the sliding changing part 15 or the slider 12. The communicating protrusion 173 may indicate a location of an end of the grip member 16 facing the folding unit. The communicating protrusion 173 may be provided at the change-movable member 155 or the transmission belt 153 of the sliding changing part 15, the slider 12, or the sliding bracket 121.

The first limiting part 171 is arranged to be spaced apart from the sliding changing part 15 to correspond to the state of the grip member 16 far away from the folding unit. The first limiting part 171 is coupled to the support plate unit 400. The first limiting part 171 detects the communicating protrusion 173. When the first limiting part 171 detects the communicating protrusion 173, sliding of the grip member 16 from the folding unit is stopped and sliding of the slider 12 approaching the folding unit is implemented.

The second limiting part 172 is arranged to be spaced apart from the sliding changing part 15 to correspond to the state of the grip member 16 approaching the folding unit. The second limiting part 172 is coupled to the support plate unit 400. The second limiting part 172 detects the communicating protrusion 173. When the second limiting part 172 detects the communicating protrusion 173, sliding of the grip member 16 toward the folding unit is stopped, and sliding of the slider 12 far away from the folding unit is implemented.

The folding unit holds a second portion of the flexible material F to be evaluated. The folding unit is arranged to be spaced apart from the sliding unit 10. The folding unit is rotated on the basis of the sliding unit 10 so as to in-fold or out-fold the flexible material F in the unfolded state.

The folding unit may include a moving unit 20, a motion guide unit 30, and a motion unit 40.

The moving unit 20 is arranged to be spaced apart from the sliding unit 10 to form the same level as the grip member 16 of the sliding unit 10 in the unfolded state. The moving unit 20 holds the second portion of the flexible material F. As the moving unit 20 is rotate along the motion guide unit 30 (on the basis of) the sliding unit 10, the flexible material F in the unfolded state may be in-folded or out-folded.

Opposite ends of the moving unit 20 are fixed to the motion unit 40 with moving brackets 21 as a medium in correspondence to the widthwise direction of the base unit B.

The moving unit 20 is pivotable on the motion unit 40 in correspondence to of in-folding operation of the flexible material F and out-folding operation of the flexible material F, and is slidably movable along a normal direction passing through an intermediate position between the sliding unit 10 and the moving unit 20. Therefore, when the moving unit 20 in-folds or out-folds the flexible material F in the unfolded state, a miscellaneous force including a tensile force is not applied to the flexible material F.

Figure 7:
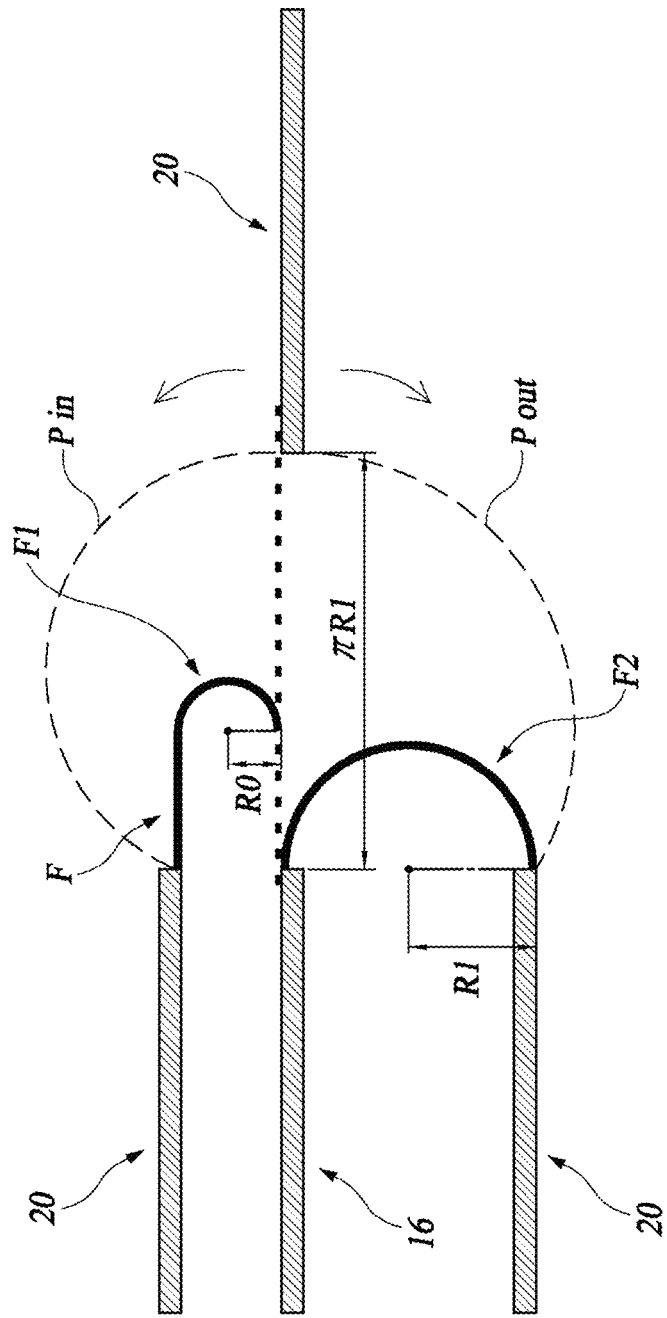
FIG. 7 is a concept view showing an in-folding operation and an out-folding operation of the sliding apparatus for durability evaluation of a flexible material according to the embodiment of the present disclosure.
Figure 8:
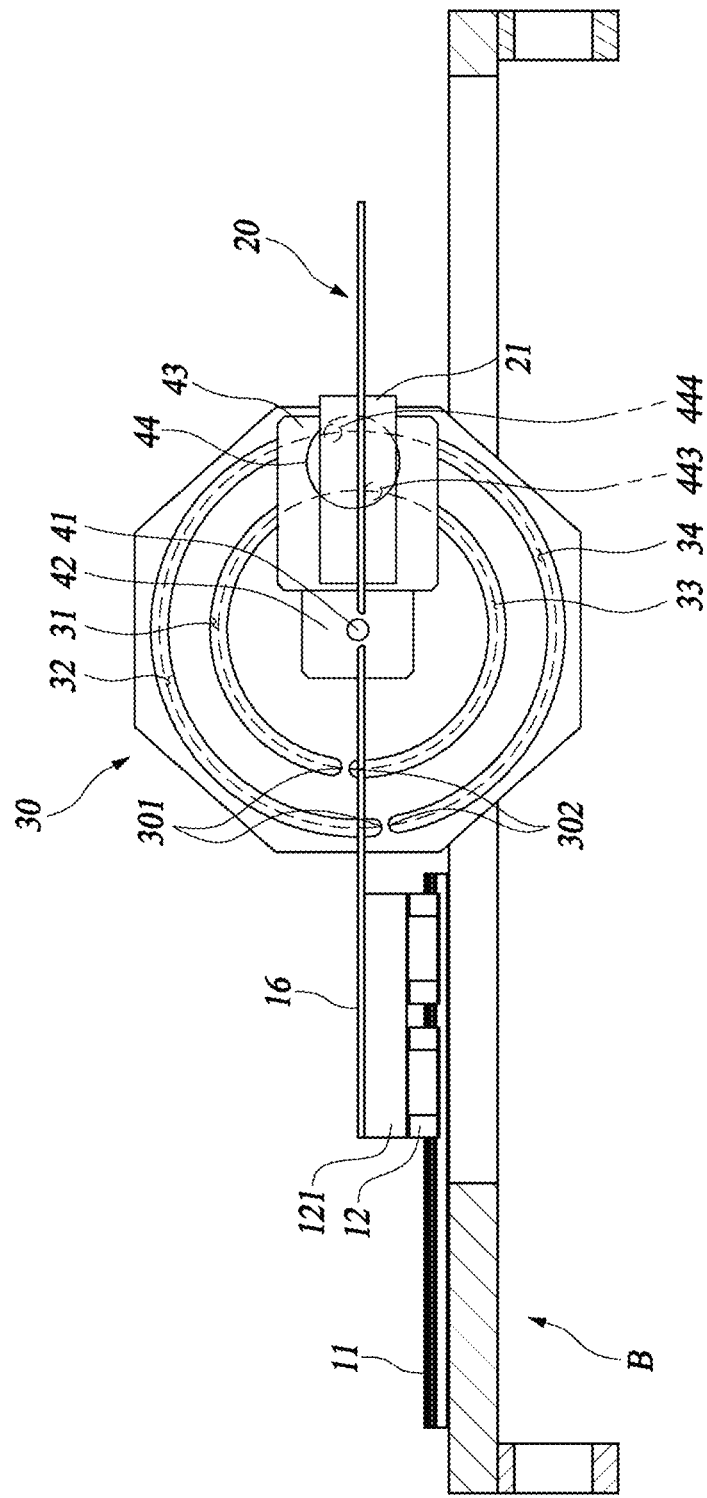
FIG. 8 is a main part view showing an unfolded state in the sliding apparatus for durability evaluation of a flexible material according to the embodiment of the present disclosure.

As shown in FIG. 7, a radius of an in-folded bent portion F1 formed in the flexible material F in the in-folded state is R0, and a radius of an out-folded bent portion F2 formed in the flexible material F in the out-folded state is R1, R1 is a radius larger than R0, and (on the basis of) the in-folding operation, a spacing distance between the sliding unit 10 and the moving unit 20 may be marked as $\pi$R1. In the embodiment of the present disclosure, R1 may indicate two to three times the value of R0.

Accordingly, when one folding unit in-folds or out-fold the flexible material F in the unfolded state in the embodiment of the present disclosure, the in-folding operation and the out-folded operation do not interfere with each other and the flexible material F can be smoothly bent.

The motion guide unit 30 forms a rotating path of the moving unit 20 so that the moving unit 20 is rotatable on the position between the sliding unit 10 and the moving unit 20. A pair of motion guide units 30 is arranged to be spaced apart from each other so as to face each other (on the basis of) the folding space B1, and the pair of motion guide units 30 is coupled to a pair of folding brackets B2, respectively.

The motion guide unit 30 has a circular guide groove formed by being recessed to correspond to the rotating path of the moving unit 20. The center of the circular guide groove may be selected as the position between the sliding unit 10 and the moving unit 20.

The guide groove may be formed as dual grooves.

The guide groove may include: an arc first in-folding groove 31 forming a moving path of a guide protrusion (a first protrusion 443) provided in the motion unit 40 in response to the in-folding operation in a moving path of the moving unit 20; an arc second in-folding groove 32 provided outside the first in-folding groove 31 in parallel and forming a moving path of a guide protrusion (a second protrusion 444) formed in the motion unit 40 in response to the in-folding operation in the moving path of the moving unit 20; an arc first out-folding groove 33 communicating with the first in-folding groove 31 and forming a moving path of the guide protrusion (the first protrusion 443) provided in the motion unit 40 in response to the out-folding operation in the moving path of the moving unit 20; and an arc second out-folding groove 34 communicating with the second in-folding groove 32 and provided outside the first out-folding groove 33 in parallel, and forming the moving path of the guide protrusion (the second protrusion 444) provided in the motion unit 40 in response to the out-folding operation in the moving path of the moving unit 20.

Then, the first in-folding groove 31 and the first out-folding groove 33 may indicate a circular shape centered at the position, and the second in-folding groove 32 and the second out-folding groove 34 may indicate a circular shape centered at the position.

Herein, the guide groove includes an in-folding stopper 301 indicating an in-folding completion position and an out-folding stopper 302 indicating an out-folding completion position, so that it is possible to prevent the moving unit 20 from being further rotated in an in-folding completion state of the flexible material F and an out-folding completion state of the flexible material F.

In other words, the in-folding stopper 301 is formed on each of a free end of the first in-folding groove 31 and a free end of the second in-folding groove 32, and the out-folding stopper 302 is formed on each of a free end of the first out-folding groove 33 and a free end of the second out-folding groove 34.

Herein, in a position of the in-folding stopper 301 (based on) the sliding unit 10 in a side view, as the in-folding stopper 301 formed on the free end of the second in-folding groove 32 is arranged lower than the in-folding stopper 301 formed on the free end of the first in-folding groove 31, the grip member 16 of the sliding unit 10 and the moving unit 20 may be arranged to be substantially parallel to each other when in-folding of the flexible material F is completed.

Furthermore, in a position of the out-folding stopper 302 (based on) the sliding unit 10 in a side view, as the out-folding stopper 302 formed on the free end of the second out-folding groove 34 is arranged lower than the out-folding stopper 302 formed on the free end of the first out-folding groove 33, when the out-folding of the flexible material F is completed, the grip member 16 of the sliding unit 10 and the moving unit 20 may be arranged to be substantially parallel to each other.

The motion unit 40 connects the motion guide unit 30 to the moving unit 20. The motion unit 40 may include the rotational shaft 41, a motion block 42, a sliding block 43, and a guide block 44. Herein, the moving unit 20 is fixed to the guide block 44 by the moving brackets 21 as a medium.

The rotational shaft 41 is provided at the position to be rotatable to the motion guide unit 30. The rotational shaft 41 is rotatably provided at the folding brackets B2. The rotational shaft 41 is rotatably coupled to the motion guide unit 30 and the folding brackets B2 by a shaft bearing as a medium.

The motion block 42 is fixed to the rotational shaft 41. The motion block 42 protrudes in an imaginary linear direction passing through the point. The motion block 42 may have a guide seating part 421 formed by recessing the motion block 42 to be coupled to a connecting guide 45. The motion block 42 may have a removably block seating part 422 into which a fixation body 442 of the guide block 44 is removably inserted in response to sliding of the sliding block 43.

The sliding block 43 is coupled to the motion block 42 to be slidable in the longitudinal direction. The sliding block 43 has a pivot hole 431, which is formed therethrough, into which the guide block 44 is rotatably inserted, so that the guide block 44 and the moving unit 20 is efficiently coupled to each other. A block support bush 432 may be provided on an inner wall of the pivot hole 431 to rotatably support a rotation body 441 of the guide block 44.

The guide block 44 is rotatably coupled to the sliding block 43. The guide block 44 has a guide protrusion formed by protruding therefrom, and the guide protrusion is coupled into the guide groove in the fitted manner so as to move along the guide groove in response to rotation of the moving unit 20. The guide block 44 is rotatably coupled to the sliding block 43 and may include the rotation body 441 to which the moving unit 20 is fixed by the moving brackets 21 as a medium, and the fixation body 442 provided on the rotation body 441 and on which the guide protrusion protrudes.

Then, as the moving unit 20 is rotated, the sliding block 43 slides (on the basis of) the motion block 42, and as the guide block 44 is rotated (on the basis of) the sliding block 43, the guide protrusion stably moves while being inserted into the guide groove, in the in-folding completion state of the flexible material F and in the out-folding completion state of the flexible material F, the grip member 16 of the sliding unit 10 and the moving unit 20 may be arranged to be substantially parallel to each other.

Herein, the guide protrusion includes two guide protrusions to correspond to the dual structure of the guide groove, and the two guide protrusions protrude on the fixation body 442 while being spaced apart from each other.

The guide protrusions include the first protrusion 443 moving in the first in-folding groove 31 and the first out-folding groove 33, and the second protrusion 444 arranged to be spaced apart from the first protrusion 443 and moving in the second in-folding groove 32 and the second out-folding groove 34. Herein, any one of the first protrusion 443 and the second protrusion 444 is included in any one of imaginary straight lines passing through the point, and the other one of the first protrusion 443 and the second protrusion 444 is included in another one of the imaginary straight lines passing through the point. In the embodiment of the present disclosure, when the first protrusion 443 is included in any one of the imaginary straight lines passing through the point, the second protrusion 444 is arranged in front of the imaginary straight line including the first protrusion 443 in the in-folding direction.

The motion unit 40 may include at least any one of the connecting guide 45 and a support bearing 46.

The connecting guide 45 connects the motion block 42 to the sliding block 43. The connecting guide 45 may include a motion supporting part coupled to the guide seating part 421 of the motion block 42, and a guide supporting part coupled to the sliding block 43 to face the motion supporting part. The connecting guide 45 may include a reducer securely fitted between the motion supporting part and the guide supporting part. Then, the connecting guide 45 may smooth sliding of the sliding block 43 with respect to the motion block 42. Furthermore, the reducer may be arranged between the motion supporting part and the guide supporting part to reduce friction.

The support bearing 46 may be inserted into the pivot hole 431 of the sliding block 43. The support bearing 46 may be provided at each of opposite side portions of the block support bush 432. The support bearing 46 may rotatably support the rotation body 441 of the guide block 44 in the sliding block 43.

The folding unit may include a motion driving unit 50 and a rotation limitation unit (not shown).

The motion driving unit 50 rotates the motion unit 40 with respect to the motion guide unit 30. The motion driving unit 50 rotates the rotational shaft 41 of the motion unit 40 forward and rearward by applied power. The motion driving unit 50 includes a motion driving shaft 51 to be connected to the rotational shaft 41 of the motion unit 40.

The motion driving unit 50 may include a reciprocatively attaching and detaching part 52 removably connecting the motion driving shaft 51 to the rotational shaft 41.

The reciprocatively attaching and detaching part 52 may include a first tap part 521 coupled to the rotational shaft 41, and a second tap part 523 coupled to the motion driving shaft 51 of the motion driving unit 50. At least two first attaching and detaching parts 522 are formed by protruding on the first tap part 521 toward the second tap part 523 while being spaced apart from each other. At least two second attaching and detaching parts 524 are formed by protruding on the second tap part 523 toward the first tap part 521 while being spaced apart from each other. Then, as the first tap part 521 and the second tap part 523 are connected to each other so that the first attaching and detaching parts 522 and the second attaching and detaching parts 524 are alternately arranged, a rotating force of the motion driving shaft 51 may be transmitted to the rotational shaft 41. Then, when the base unit B moves to correspond to a shaft direction of the rotational shaft 41 or the motion driving shaft 51, the first tap part 521 and the second tap part 523 may be separated from each other.

The reciprocatively attaching and detaching part 52 may include a joint part 525 located between the first tap part 521 and the second tap part 523 and coupled to both the first tap part 521 and the second tap part 523 in the fitted manner. The joint part 525 includes a first joint attaching and detaching part 526 formed by recessing a surface facing the first tap part 521 to correspond to the first attaching and detaching parts 522, and a second joint attaching and detaching part 527 formed by recessing a surface facing the second tap part 523 to correspond to the second attaching and detaching parts 524. Then, the first attaching and detaching parts 522 are fitted into the first joint attaching and detaching part 526 and the second attaching and detaching parts 524 are fitted into the second joint attaching and detaching part 527, the rotating force of the motion driving shaft 51 may be transmitted to the rotational shaft 41. Then, when the base unit B moves to correspond to a the shaft direction of the rotational shaft 41 or the motion driving shaft 51, the first tap part 521, the joint part 525, and the second tap part 523 may be separated from each other. Herein, when the reciprocatively attaching and detaching part 52 includes the first tap part 521, the joint part 525, and the second tap part 523, and when the first joint attaching and detaching part 526 is formed by recessing the first tap part 521, the first attaching and detaching parts 522 may protrude on the joint part 525, and when the second joint attaching and detaching part 527 is formed by recessing the second tap part 523, the second attaching and detaching parts 524 may protrude on the joint part 525.

The rotation limitation unit (not shown) selects whether the moving unit 20 or the motion unit 40 is rotated or not with respect to the motion guide unit 30 at the point. The rotation limitation unit (not shown) may include a limitation bracket provided at any one of the pair of folding brackets B2, and a limitation lever pivotably coupled to the limitation bracket. The limitation lever has a shaft passing hole through which the rotational shaft 41 passes.

Then, in a position where the limitation level in the initial state is substantially parallel to the folding brackets B2, the rotational shaft 41 is rotatably arranged in the shaft passing hole, so that the limitation lever does not interfere with the rotational shaft 41. In a position where the limitation lever is pivoted to be arranged at an inclination against the folding brackets B2, an inner surface of the shaft passing hole is in contact with or in close contact with a support surface formed on an outer circumferential surface of the rotational shaft 41. Therefore, the limitation lever is locked to the rotational shaft 41 so as to prevent the rotational shaft 41 from being rotated.

The sliding support unit 70 supports the flexible material F when the sliding unit 10 slides on the base unit B with the flexible material F in the in-folded or out-folded state.

The sliding support unit 70 may include at least any one of a first supporter 71, a second supporter 72, and a third supporter 73.

Figure 10:
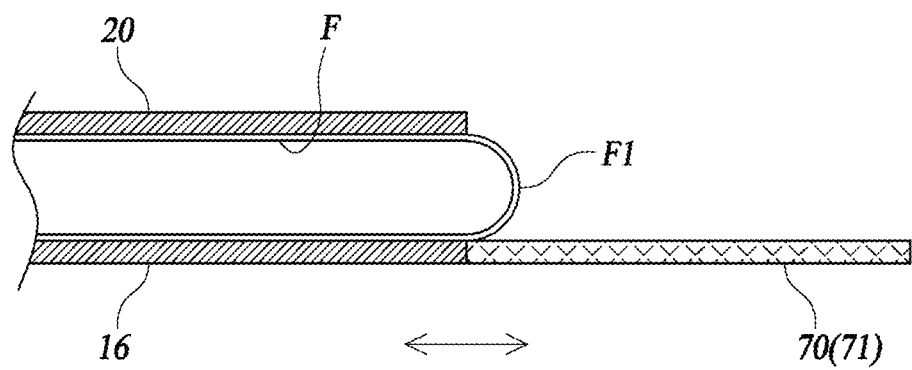
FIG. 10 is a main part enlarged view showing an initial arrangement state of a grip member and a moving unit when the in-folding is completed in the sliding apparatus for durability evaluation of a flexible material according to the embodiment of the present disclosure.

The first supporter 71 may be formed by being extended from the grip member 16 on the basis of the in-folding operation. As shown in FIG. 10, the first supporter 71 is formed by being extended on the same level as the grip member 16 of the sliding unit 10 when the in-folding operation is completed. When the in-folding operation is completed and the grip member 16 slides, the first supporter 71 may move together with the grip member 16 and support the flexible material F. Therefore, the bent portion (in-folded bent portion F1) of the flexible material F moves to maintain the radius, and sagging of the flexible material F may be prevented. As the first supporter 71 is coupled to the grip member 16 when the in-folding operation is completed, it is possible to prevent the first supporter 71 from interfering with the moving unit 20 in the in-folding operation. Herein, coupling between the grip member 16 and the first supporter 71 is not limited.

Figure 12:
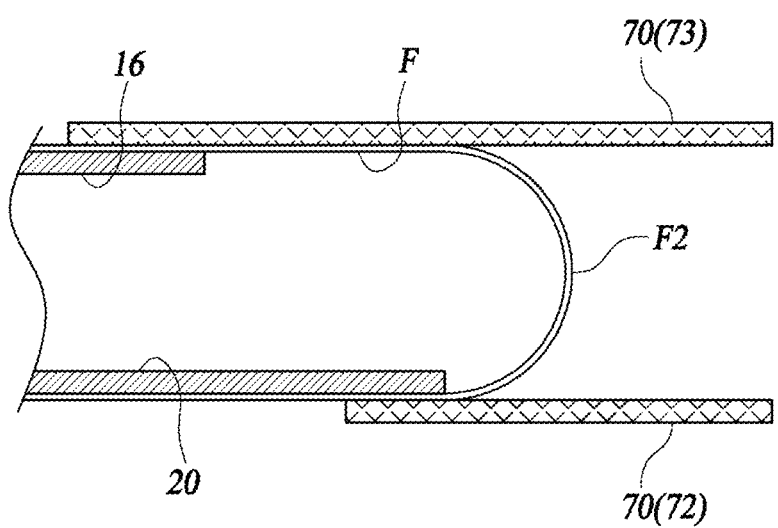
FIG. 12 is a main part enlarged view showing an initial arrangement state of the grip member and the moving unit when the out-folding is completed in the sliding apparatus for durability evaluation of a flexible material according to the embodiment of the present disclosure.

The second supporter 72 is supported-layered on the flexible material F layered on the moving unit 20. As shown in FIG. 12, when the out-folding operation is completed, the second supporter 72 is layered on and supported by the flexible material F layered on an end of the moving unit 20. When the grip member 16 slides in a completion state of the out-folding operation, the second supporter 72 may support the flexible material F, and the bent portion (out-folded bent portion F2) of the flexible material F moves. Therefore, the flexible material F may be horizontally supported, and sagging of the flexible material F may be prevented. The second supporter 72 may be layered on and supported by the flexible material F in the moving unit 20 in the completed state of the out-folded operation, or may be layered on and supported by the flexible material F in the moving unit 20 in the unfolding state. The second supporter 72 may be coupled to supporter coupling parts provided in the moving brackets 21.

The third supporter 73 is layered on and supported by the flexible material F layered on the grip member 16 in the basis of the out-folding operation. As shown in FIG. 12, since the third supporter 73 may support the flexible material F when the grip member 16 slides in the out-folding completion state, while the bent portion (out-folded bent portion F2) of the flexible material F moves, the third supporter 73 supports the flexible material F together with the second supporter 72 to maintain the radius constant, and shape change of the bent portion (out-folded bent portion F2) of the flexible material F may be prevented. The third supporter 73 may be layered on and supported by the flexible material F in the grip member 16 in the unfolding state, or may be layered on and supported by the flexible material F in the grip member 16 in the out-folding completion state. Herein, the third supporter 73 may be coupled to the grip member 16 while being layered on and supported by the flexible material F layered on the grip member 16.

Figure 9:
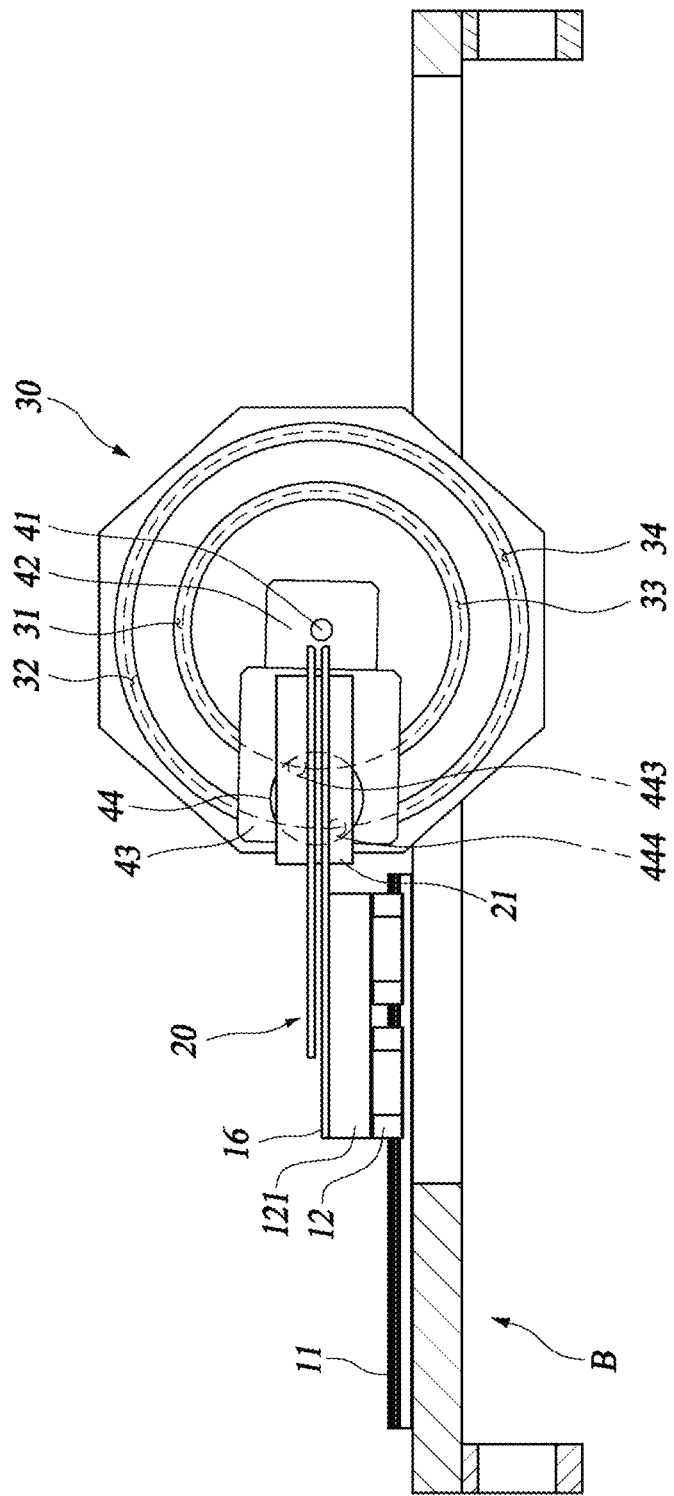
FIG. 9 is a main part view showing an in-folding completion state in the sliding apparatus for durability evaluation of a flexible material according to the embodiment of the present disclosure.

Then, since the in-folding operation is implemented in the unfolding state (when the second limiting part 172 detects the communicating protrusion 173) in which the grip member 16 approaches the moving unit 20 to correspond to the in-folding operation to indicate the spacing distance of πR1, in the in-folding completion state as shown in FIGS. 9 and 10, sliding of the grip member 16 is smoother and the first supporter 71 may stably support the flexible material F.

Figure 11:
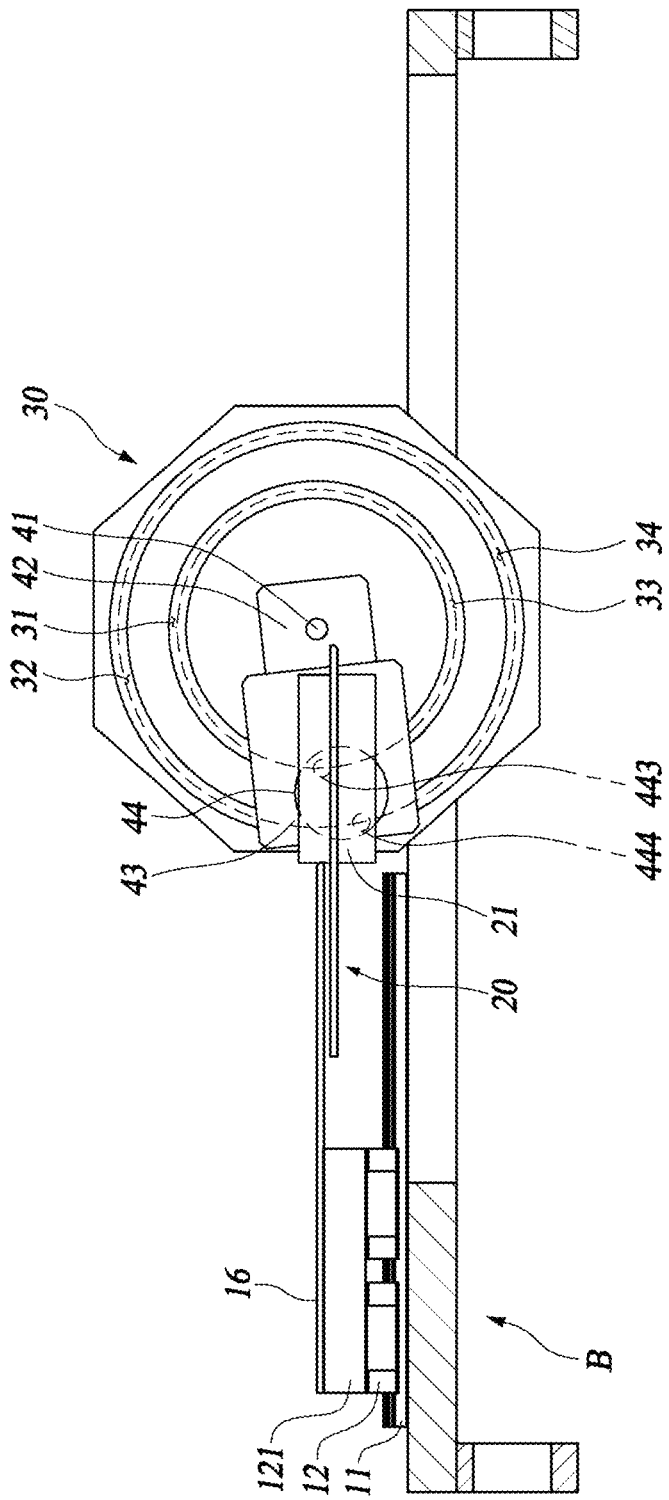
FIG. 11 is a main part view showing an out-folding completion state in the sliding apparatus for durability evaluation of a flexible material according to the embodiment of the present disclosure.

Furthermore, since the out-folding operation is implemented in the unfolding state (when the first limiting part 171 detects the communicating protrusion 173) in which the grip member 16 is far away from the moving unit 20 to correspond to the out-folding operation, in the out-folding completion state as shown in FIGS. 11 and 12, sliding of the grip member 16 is smoother, and the second supporter 72 and the third supporter 73 may stably support the flexible material F while operating in conjunction with each other.

The sliding apparatus 100 is coupled to the system main body 200. In the system main body 200, an evaluation space is opened and closed by an evaluation door, so that various parts such as the sliding motor 14, the motion driving unit 50, etc. that are arranged in the evaluation space may be maintained as the evaluation space is opened, and various parts such as the sliding motor 14, the motion driving unit 50, etc. that are arranged in the evaluation space may be protected as the evaluation space is closed.

The system main body 200 has an operation space 201 in which the sliding apparatus 100 is arranged, and the operation space 201 may be opened and closed by an operation door 210. A camera unit 220 may be provided at an upper portion of the operation space 201 of the system main body 200 to monitor the sliding apparatus 100. The camera unit 220 may be provided in the support plate unit 400 or the operation door 21 to capture the sliding apparatus 100.

The system main body 200 includes the work plate unit 300 and the support plate unit 400, and may include at least any one of a control unit (not shown) and a display (not shown).

The base unit B is coupled to the work plate unit 300. The work plate unit 300 has a communication space 310 formed by penetrating the work plate unit 300 to correspond to the folding space B1. Therefore, when the moving unit 20 of the folding unit implements the folding operation, the moving unit 20 may be prevented from interfering with the work plate unit 300.

The support plate unit 400 has a plate shape and is provided on the work plate unit 300. The support plate unit 400 may protrude to be substantially vertical onto an upper surface of the work plate unit 300. The support plate unit 400 supports both the motion driving unit 50 and the sliding motor 14 that are provided in the folding unit and the sliding unit 10 toward the inspection space. The support plate unit 400 support the sliding changing part 15 provided in the sliding unit 10 toward the base unit B.

The control unit (not shown) controls an operation of the sliding apparatus 100. The control unit (not shown) specifies the unfolding state in response to a detecting operation of the motion limiting sensor part 17, and controls an operation of the motion driving unit 50 to control the in-folding operation and the out-folding operation. The control unit (not shown) controls an operation of the sliding motor 14 operated in conjunction with the motion limiting sensor part 17 so that sliding of the grip member 16 may be controlled.

The control unit (not show) may control an operation of the camera unit 220.

A display (not shown) visually indicates an operational of the sliding apparatus 100 and a control state of the control unit (not shown).

Hereinbelow, according to the embodiment of the present disclosure, operations of the sliding apparatus 100 and the evaluation system for evaluating the durability of the flexible material F will be described.

<In-Folding Operation>

The sliding apparatus 100 is held at a regular location on the work plate unit 300 according to the specifications of the flexible material F. Herein, the grip member 16 of the sliding unit 10 implements the spacing distance of πR1 from the moving unit 20 thus forming substantially the same level as the moving unit 20, and the second limiting part 172 is in a state of detecting the communicating protrusion 173.

Then, when opposite ends of the flexible material F are respectively fixed to the grip member 16 and the moving unit 20 and the motion driving unit 50 is operated, the first protrusion 443 and the second protrusion 444 move respectively along the first in-folding groove 31 and the second in-folding groove 32 and then are stopped while being supported by the in-folding stopper 301, and thus the in-folding operation is completed.

Next, the sliding unit 10 may slidingly move the grip member 16 far away from the rotational shaft 41, so that the first limiting part 171 detects the communicating protrusion 173. Furthermore, when the first limiting part 171 detects the communicating protrusion 173, in order for the second limiting part 172 to detect the communicating protrusion 173, the sliding unit may slidingly move the grip member 16 so that the grip member 16 approaches the rotational shaft 41.

<Unfolding Operation>

The sliding apparatus 100 is held at a regular location on the work plate unit 300 according to the specifications of the flexible material F. Herein, the grip member 16 of the sliding unit 10 forms substantially the same level as the moving unit 20, and the first limiting part 171 becomes a state of detecting the communicating protrusion 173.

In addition, when the opposite ends of the flexible material F are respectively fixed to the grip member 16 and the moving unit 20 and the motion driving unit 50 is operated, the first protrusion 443 and the second protrusion 444 move respectively along the first out-folding groove 33 and the second out-folding groove 34 and then are supported while being supported by the out-folding stopper 302, and thus the out-folding operation is completed.

Next, in order to allow the second limiting part 172 to detect the communicating protrusion 173, the sliding unit 10 may slidingly move the grip member 16 so that the grip member 16 approaches the rotational shaft 41. Furthermore, in order to allow the first limiting part 171 to detect the communicating protrusion 173 with the second limiting part 172 detecting the communicating protrusion 173, the sliding unit 10 may slidingly move the grip member 16 so that grip member 16 is move far away from the rotational shaft 41.

According to the sliding apparatus 100 and the evaluation system for durability evaluation of the flexible material F as described above, when the folding test of the flexible material F is performed, the one folding unit implements the in-folding operation and the out-folding operation of the flexible material F in the unfolded state, and the one folding unit may implement a sliding operation, so that a forming position of the bent portion F1, F2 formed in the flexible material F in the folded state is changed.

In other words, when a folding test of the film type flexible material F is performed, as the one folding unit repeatedly folds both opposite surfaces of the flexible material F 180 degrees each on the basis of the flexible material F, the flexible material F may be repeatedly folded opposite directions, and as the sliding unit 10 slidingly moves in the folded state, a position of the bent portion F1, F2 formed in the flexible material F may be changed.

Furthermore, with coupling between the sliding unit 10 and the folding unit in the base unit B, initial settings of the flexible material F can be clarified, a sliding operation of the sliding unit 10 and a folding operation of the folding unit can be clarified, and sliding of the sliding unit 10 in the folding state can be clarified.

Furthermore, with the detailed structure of the sliding unit 10, sliding of the slider 12 on the base unit B may be smooth, it is possible to prevent the folding unit from interfering with the sliding unit 10 in response to the out-folding operation of the folding unit.

Furthermore, with the additional structure of the sliding motor 14 and the sliding changing part 15 in the sliding unit 10, a linear movement of the slider 12 may be stabilized by the rotating force of the sliding motor 14 and a linear reciprocating the flexible material F can be clarified.

Furthermore, with the additional structure of the connecting bracket 13 in the sliding unit 10, the connecting bracket 13 and the sliding changing part 15 may be removably coupled to each other, and it is possible to separate the connecting bracket 13 and the slider 12 from the sliding changing part 15, so that the sliding apparatus 100 can be easily maintained and replaced in response to the specification of the flexible material F.

Furthermore, with the detailed structure of the sliding changing part 15 in the sliding unit 10, a rotating movement of the sliding motor 14 is converted into a linear reciprocating movement of the slider 12 so that the sliding movement of the slider 12 can be efficiently performed.

Furthermore, with the detailed structure of the folding unit, the folding operation of the flexible material F is clarified, and a radius R0 of the in-folded bent portion F1 according to in-folding and a radius R1 of the out-folded bent portion F2 according to out-folding may be implemented differently from each other.

Furthermore, the coupling between the motion guide unit 30 and the motion unit 40 in the folding unit, it is possible to prevent the moving unit 20 from flowing unnecessarily in the rotating process of the moving unit 20.

Furthermore, with the detailed structure of the motion unit 40, rotation of the moving unit 20 is smoothly performed, and when a folding test of the flexible material F is performed, and when an in-folding operation and an out-folding operation are implemented, the flexible material F is prevented from receiving a miscellaneous force including a tensile force, so that the reliability of the test is high and durability evaluation can be accurately performed.

Furthermore, with the structure of the stopper 301, 302, when a folding test of the flexible material F is performed, and when the in-folding operation and the out-folding operation are implemented, the guide protrusion is stopped in the guide groove, and the folding completion state of the flexible material F can be clarified.

Furthermore, with the detailed structure of the guide groove, the rotating path of the moving unit 20 is clarified, and a parallel state between the grip member 16 of the sliding unit 10 and the moving unit 20 at the folding completion position may be stabilized.

Furthermore, with the detailed structure of the guide protrusion, when the moving unit 20 is rotated, an operation of the motion unit 40 may be stabilized.

Furthermore, with the structure of the motion driving unit 50, a folding test may be automated.

Furthermore, with the structure of the rotation limitation unit (not shown), it is possible to select whether the moving unit 20 is rotated or not.

Furthermore, with the additional structure of the motion limiting sensor part 17 in the sliding unit 10, sliding of the slider 12 is limited, an initial position of the slider 12 in the unfolding state can be clarified in response to the in-folding operation and the out-folding operation.

Furthermore, with the additional structure of the sliding support unit 70, as the slider 12 slidably moves in a state with the folded flexible material F, the radius of the bent portion formed in the flexible material F is maintained, and position tracking of the bent portion may be checked.

Furthermore, with numerical limitation, it is possible to prevent the in-folding operation and out-folding operation from interfering with each other in the one folding unit, and the flexible material F may be safely protected.

Furthermore, with the additional structure of the work plate unit 300, the base unit B of the sliding apparatus 100 may be located in a regular position thereof, and corresponding to an operation of the sliding apparatus 100, it is possible to prevent the base unit B from flowing.

Furthermore, with the additional structure of the support plate unit 400, the sliding motor 14 of the sliding apparatus 100, the motion driving unit 50 of the folding unit, the sliding changing part 15, and the motion limiting sensor part 17 are locked to regular positions thereof, and power transmission system can be clarified.

Furthermore, with the communication space 310, corresponding to the out-folding operation, it is possible to prevent the moving unit 20 from interfering with the work plate unit 300.

Although the preferred embodiment of the present invention has been described with reference to the accompanying drawings, those skilled in the art will variously modify or change the present disclosure without departing from the scope and spirit of the present disclosure as disclosed in the accompanying claims.

INDUSTRIAL APPLICABILITY

When a folding test of the flexible material is performed, the present disclosure can implement the in-folding operation and the out-folding operation of the flexible material in the unfolding state in the one folding unit, and the present disclosure can implement sliding operation, so that a position of the bent portion formed in the flexible material in the folding state is changed.

What is claimed is:
1. A sliding apparatus for durability evaluation of a flexible material, the sliding apparatus comprising:
 a base unit having a folding space formed therethrough;
 a sliding unit configured to hold a first portion of the flexible material to be evaluated, and coupled to the base unit to be slidably movable; and
 a folding unit configured to hold a second portion of the flexible material, and arranged to be spaced apart from the sliding unit, and configured to be rotated based on the sliding unit to in-fold or out-fold the flexible material in an unfolded state,
 wherein the sliding unit is configured to change a position of a bent portion formed in the flexible material as the sliding unit slidably moves on the base unit with the flexible material in an in-folded state or out-folded state,
 wherein the folding unit comprises:
  a moving unit arranged to be spaced apart from the sliding unit so as to form the same level as the sliding unit in the unfolded state, and configured to hold the second portion of the flexible material;
  a motion guide unit configured to form a rotating path of the moving unit to allow the moving unit to be rotatable on a position between the sliding unit and the moving unit; and
  a motion unit connecting the motion guide unit to the moving unit,
 wherein the moving unit is configured to in-fold or out-fold the flexible material in the unfolded state as being rotated along the motion guide unit with respect to the sliding unit,
 wherein the motion guide unit comprises a circular guide groove formed by being recessed to correspond to the rotating path of the moving unit,
 wherein the motion unit comprises:
  a rotational shaft rotatably provided at the position to be rotatable with respect to the motion guide unit;
  a motion block fixed to the rotational shaft;
  a sliding block coupled to the motion block to be slidable in the longitudinal direction; and
  a guide block rotatably coupled to the sliding block, and having a guide protrusion protruding thereon, the guide protrusion being coupled to the guide groove in a fitted manner so that the guide block moves along the guide groove to correspond to rotation of the moving unit, and
 wherein the moving unit is fixed to the guide block.
2. The sliding apparatus of claim 1, wherein the sliding unit comprises:
 a sliding rail formed long at the base unit in a longitudinal direction of the base unit;
 a slider slidably coupled to the sliding rail; and
 a grip member coupled to the slider, and configured to hold the first portion of the flexible material.
3. The sliding apparatus of claim 2, wherein the sliding unit further comprises:
 a sliding motor configured to generate a rotating force; and
 a sliding changing part configured to move the slider by the rotating force of the sliding motor.
4. The sliding apparatus of claim 3, wherein the sliding unit further comprises:
 a connecting bracket provided at the slider to face the sliding changing part, and removably coupled to the sliding changing part.

5. The sliding apparatus of claim 2, wherein the sliding unit further comprises:
   a motion limiting sensor part configured to detect a state of the grip member approaching the folding unit and a state of the grip member far away from the folding unit so as to limit a sliding motion of the slider.

6. The sliding apparatus of claim 1, wherein the guide groove comprises:
   an in-folding stopper configured to mark an in-folding completion position; and
   an out-folding stopper configured to mark an out-folding completion position.

7. The sliding apparatus of claim 1, wherein the guide groove comprises:
   a first arc in-folding groove to generate a moving path of the guide protrusion in response to an in-folding operation on the moving path of the moving unit;
   a second arc in-folding groove provided outside the first in-folding groove in parallel, and configured to generate a moving path of the guide protrusion in response to the in-folding operation on the moving path of the moving unit;
   a first arc out-folding groove communicating with the first in-folding groove, and configured to generate a moving path of the guide protrusion in response to an out-folding operation on the moving path of the moving unit; and
   a second arc out-folding groove provided outside the first out-folding groove in parallel while communicating with the second in-folding groove, and configured to generate a moving path of the guide protrusion in response to the out-folding operation on the moving path of the moving unit.

8. The sliding apparatus of claim 7, wherein the guide protrusion comprises:
   a first protrusion configured to move inside the first in-folding groove and the first out-folding groove; and
   a second protrusion configured to move inside the second in-folding groove and the second out-folding groove,
   wherein any one of the first protrusion and the second protrusion is included in any one of imaginary straight lines passing through the position, and
   wherein the other of the first protrusion and the second protrusion is included in another line of the imaginary straight lines passing through the position.

9. The sliding apparatus of claim 1, wherein the folding unit further comprises:
   at least any one of a motion driving unit configured to rotate the motion unit with respect to the motion guide unit; and
   a rotation limitation unit configured to select whether the moving unit is rotated or not with respect to the motion guide unit at the position.

10. The sliding apparatus of claim 1, further comprising:
    a sliding support unit configured to support the flexible material when the sliding unit slidably moves from the base unit while the flexible material is in-folded or out-folded.

11. The sliding apparatus of claim 1, wherein, when a radius of the in-folded bent portion formed in the flexible material in the in-folded state is R0 and a radius of the out-folded bent portion formed in the flexible material in the out-folded state is R1, R1 indicates a radius larger than R0, and
    wherein a spacing distance between the sliding unit and the moving unit on the basis of the in-folding operation indicates $\pi$R1.

12. An evaluation system for durability of a flexible material, the evaluation system comprising:
    the sliding apparatus of claim 1;
    a work plate unit coupled to the base unit; and
    a support plate unit provided in the work plate unit, and configured to support a sliding motor provided in the sliding unit and a motion driving unit provided in the folding unit.

13. The evaluation system of claim 12, wherein the work plate unit has a communication space formed by penetrating therethrough to correspond to the folding space.

* * * * *